United States Patent [19]

Dunn, Jr.

[11] 3,729,543

[45] Apr. 24, 1973

[54] PROCESS FOR PREPARING ALKALI-METAL TETRA-CHLOROFERRATE

[75] Inventor: Wendell E. Dunn, Jr., Woollahra, NSW, Australia

[73] Assignee: Wendell E. Dunn, Inc., Wilmington, Del.

[22] Filed: Jan. 21, 1971

[21] Appl. No.: 108,570

[52] U.S. Cl. ............... 423/138, 423/150, 423/179, 423/208, 423/463
[51] Int. Cl. ...... C01g 49/10, C01d 3/04, C01d 11/04
[58] Field of Search ............................ 23/87 R, 89; 423/138, 150, 179, 208, 463

[56] References Cited

UNITED STATES PATENTS

| | | | |
|---|---|---|---|
| 3,294,482 | 12/1966 | Lerner | 23/87 R X |
| 2,928,722 | 3/1960 | Scheller | 23/87 R X |
| 3,411,869 | 11/1968 | Bradley et al. | 23/87 R |

OTHER PUBLICATIONS

H. Remy's "Treatise on Inorg. Chem.," Vol. 2, 1956 Ed., pp. 282 and 283, Elsevier Pub. Co., New York.
J. W. Mellor's "A Comprehensive Treatise on Inorg. and Theoretical Chem.," Vol. 14, 1935, pp. 75, 101–103, Longmans, Green & Co., New York.
C. A. Jacobson's "Encyclopedia of Chem. Reactions," Vol. 4, 1951 Ed., page 37, Reinhold Pub. Corp., New York.

Primary Examiner—Edward Stern
Attorney—Samuel V. Abramo

[57] ABSTRACT

Claimed is a process for producing anhydrous alkali-metal tetrachloroferrates by heating with distillation a mixture of an alkali-metal chloride and a hydrous ferric chloride or an aqueous mixture of an alkali-metal chloride and ferric chloride.

The alkali-metal tetrachloroferrates are useful as intermediates for producing chlorine.

6 Claims, No Drawings

PROCESS FOR PREPARING ALKALI-METAL TETRA-CHLOROFERRATE

FIELD OF THE INVENTION

This invention relates to a process for producing alkali-metal tetrachloroferrates.

SUMMARY OF THE INVENTION

This invention is directed to a process for producing anhydrous alkali-metal tetrachloroferrates $XFeCl_4$, wherein X is an alkali-metal cation comprising heating a hydrated ferric chloride or a solution of ferric chloride with an alkali-metal chloride and removing water by distillation.

Alkali-metal tetrachloroferrates are useful for producing chlorine by the Deacon process as described in U. S. Pat. No. 3,376,112.

DESCRIPTION OF THE PREFERRED EMBODIMENTS

The existence of sodium and potassium tetrachloroferrates by the reaction of anhydrous ferric chloride with sodium chloride or potassium chloride, has been described [C. M. Cook, Jr. and W. E. Dunn, Jr., J. Phy. Chemo., 65 1505(1961)]. The chloroferrates in anhydrous state provide a convenient chlorine containing substances useful as a raw material for the production of chlorine by the Deacon process as described in U. S. Pat. No. 3,376,112.

The use of anhydrous ferric chloride to produce chloroferrates is presently uneconomical and inconvenient. In the first place, anhydrous ferric chloride, cannot be readily prepared from inexpensive hydrous ferric chloride. Secondly, it is difficult and expensive to handle hydroscopic material such as anhydrous ferric chloride and at the same time maintain anhydrous conditions.

I have invented a process for preparing a alkali-metal tetrachloroferrates comprising heating a mixture of an alkali-metal chloride such as sodium chloride or potassium chloride with a hydrous ferric chloride followed by evaporating the water of hydration. It is within the scope of my invention to prepare an anhydrous alkali-metal tetrachloroferrates by heating an aqueous mixture of ferric chloride, an alkali-metal chloride such as sodium chloride or potassium chloride and evaporating the water. It is also within the scope of my invention to prepare an anhydrous alkali-metal tetrachloroferrate by reacting an alkali-metal chloride with ferric chloride dissolved in hydrochloric acid.

By alkali-metal chloride it is meant lithium chloride, sodium chloride, potassium chloride, rubidium chloride, and cesium chloride which can be anhydrous or hydrated. By hydrated ferric chloride, it is meant, the compound $FeCl_3$—$6H_2O$ and any other ferric chlorides containing various waters of hydration.

When hydrochloric acid is present, the acid can be either concentrated, i.e., 20 percent, by weight, or dilute, for example, the concentration can be 1.0 molar, 0.1 molar, 0.01 molar, 0.001 molar, or higher or lower.

The reaction can be conducted in glass or quartz equipment. Also equipment made of corrosion resistant metal can be used. Also, a Pyrex glass flask equipped with a sidearm can be used. The ferric chloride and alkali-metal chloride are mixed together in approximately equimolar amounts. Preferably equal moles of the alkali-metal chloride and ferric chloride are reacted, however, some product can be obtained when more of one of the reactants is used. It is convenient to use a slight excess of inexpensive sodium chloride. The excess sodium chloride can be removed from the product by leaching with water as described below and recycled to produce additional product.

Sequence of addition of the reactants is not critical, but in general it is convenient to add the alkali-metal chloride in solid form to the ferric chloride hydrate or solution of ferric chloride. When ferric chloride is used, the application of a small amount of heat is sufficient to produce a solution of the ingredients. In this case, the water of hydration serves as the solvent to form the solution.

The reaction is conducted at temperatures of in the range of 40° to about 310°. When equal molar amounts of hydrous ferric chloride and alkali-metal chloride are reacted, it is convenient to gradually heat them to about 40° to 60° where a solution of the reactants in the water of hydration occurs. This solution is heated to a temperature where the water boils. The water is distilled to yield a crude product amounting, in general, to 90 to 95 percent of the theoretical amount when stoichiometric amounts of reactants are used.

The reaction is generally conducted at atmospheric pressures, although higher or lower pressures can be used, for example, pressures of up to 150 atmospheres or higher can be used as well as reduced pressures of down to 0.1 mm. of Hg or lower. Reduced pressure can be useful to facilitate the removal of water from the reaction and to decrease the reaction time.

It was highly unexpected that the products described herein could be produced in the presence of water. The use of aqueous systems and of hydrated reactants is beneficial because it allows the use of more readily available hydrous ferric chloride.

The product, which is a liquid at high temperature, can be used to make chlorine without further purification. However, unreacted alkali-metal chloride, ferric chloride and hydrochloric acid can be removed by leaching the product with water. The product can be dried over a drying agent or by heating with or without a vacuum.

The procedure can be modified by applying a vacuum to the reaction flask to facilitate the removal of water. Reduced pressure down to 0.1 mm. of Hg can be used.

The following examples further illustrate the invention.

EXAMPLE 1

Sodium Tetrachloroferrate

A mixture of 270.3g. (1.0 mole) of ferric chloride hexahydrate and 58.4g. (1.0 mole) of sodium chloride was heated in a flask. The mixture started to melt at 40°C. and was completely melted at 60°C. Boiling took place at 124°C. and stopped 313°C. Hydrogen chloride was given off at 300° – 310°C. The residue was cooled and leached with water. A yield of about 345g. (94%) of sodium tetrachloroferrate ($NaFeCl_4$) was obtained.

EXAMPLE 2

Potassium Tetrachloroferrate

The procedure of Example 1 is repeated except that 74.55g. (1.0 mole) of potassium chloride is used instead of sodium chloride. The product obtained is anhydrous potassium tetrachloroferrate ($KFeCl_4$).

EXAMPLE 3

Rubidium tetrachloroferrate

The procedure of Example 1 is repeated except that 120.94g. (1.0 mole) of rubidium chloride is used instead of sodium chloride. The product obtained is rubidium tetrachloroferrate ($RuFeCl_4$).

Cesium tetrachloroferrate ($CsFeCl_4$) is prepared similarly using an equivalent amount of cesium chloride instead of the sodium chloride used.

EXAMPLE 4

Sodium tetrachloroferrate

A solution of 270.3g. (1.0 mole) of ferric chloride hexahydrate, 58.4g. (1.0 mole) of sodium-chloride, and 200 g. of water is heated in a flask. Boiling which occurred above 100°C. is continued until the temperature of the contents of the flask reached about 310°C. The residue is cooled and collected. The residue is anhydrous sodium tetrachloroferrate ($NaFeCl_4$).

EXAMPLE 5

Sodium Tetrachloroferrate

A solution of 270.3g. (1.0 mole) of ferric chloride hexahydrate, 58.4g (1.0 mole) of sodium chloride, 200g. of water and 100g. of concentrated hydrochloric acid is heated in a flask. The water and acid is removed by heating the flask from a temperature of about 100°C. where distillation of water occurs. The flask is heated to a temperature of about 310°C. Sodium tetrachloroferrate is obtained in nearly theoretical amounts.

The procedures described in Examples 4 and 5 can be modified using various amounts of water and hydrochloric acid. Additionally, the procedures of Examples 4 and 5 can be used to prepare other alkali-metal salts of the tetrachloroferrate anion.

The alkali-metal tetrachloroferrates are useful in a process for the production of chlorine which is useful for producing insecticides. For example U. S. Pat. No. 3,376,112 discloses a modification of the well known Deacon process for producing chlorine from sodium tetrachloroferrate. All of the alkali-metal tetrachloroferrate disclosed herein can be used in the modified Deacon process to prepare chlorine.

The foregoing detailed description has been given for clarity of understanding only and no unnecessary limitations are to be understood therefrom. The invention is not limited to the exact details shown and described for obvious modifications will occur to those skilled in the art.

The preferred embodiments in which an exclusive privilege or position is claimed are as follows:

1. A process for producing an anhydrous alkali metal tetrachloroferrate of the formula $$XFeCl_4$$

wherein X is an alkali metal cation, comprising heating in the temperature range of 40°–60°C., a mixture of approximately equal molar amounts of a hydrated ferric chloride or an aqueous solution of ferric chloride with an alkali metal chloride and thereafter heating the mixture from boiling up until the temperature of the mixture reaches about 310°C., thereby removing the water present in the mixture by distillation thereafter removing any unreacted components and recovering said alkali metal tetrachloroferrate.

2. The process of claim 1 for producing lithium tetrachloroferrate wherein the alkali metal chloride is lithium chloride.

3. The process of claim 1 for producing sodium tetrachloroferrate wherein the alkali metal chloride is sodium chloride.

4. The process of claim 1 for producing potassium tetrachloroferrate wherein the alkali metal chloride is potassium chloride.

5. The process of claim 1 for producing rubidium tetrachloroferrate wherein the alkali metal chloride is rubidium chloride.

6. The process of claim 1 for producing cesium tetrachloroferrate wherein the alkali metal chloride is cesium chloride.

* * * * *